US005656164A

United States Patent [19]

Vado et al.

[11] Patent Number: 5,656,164

[45] Date of Patent: Aug. 12, 1997

[54] COMPACT APPARATUS FOR CENTRIFUGAL SEPARATION

[76] Inventors: Giovanni Antonio Vado, Regione Taulera; Domenico Manca, Via Carrabuffas, both of 07041 Alghero(SS), Italy

[21] Appl. No.: 586,975

[22] Filed: Jan. 16, 1996

[30] Foreign Application Priority Data

May 19, 1995 [IT] Italy .............................. RM950113 U

[51] Int. Cl.[6] .................................................. B01D 21/26

[52] U.S. Cl. ......................... 210/380.1; 210/295; 494/36

[58] Field of Search .................................... 210/787, 143, 210/232, 295, 297, 304, 360.1, 367, 380.1; 494/36

[56] References Cited

U.S. PATENT DOCUMENTS 4,353,499 10/1982 Simonds .................................. 494/36
4,557,831 12/1985 Lindsay et al. ...................... 210/360.1
5,391,304 2/1995 Lantos .................................... 210/787

*Primary Examiner*—David A. Reifsnyder
*Attorney, Agent, or Firm*—Beveridge, DeGrandi, Weilacher & Young, L.L.P.

[57] ABSTRACT

A reduced size apparatus for centrifugal separation, has a housing, a motor coupled to the housing, and a cartridge in the housing. The cartridge is coupled with and rotated by the shaft of the motor. A feeding channel carries liquid into the cartridge. A second channel extends from the upper region in the cartridge through the rotary shaft to a third channel for ejecting the liquid.

12 Claims, 2 Drawing Sheets

COMPACT APPARATUS FOR CENTRIFUGAL SEPARATION

The present invention relates to a reduced size apparatus for centrifugal separation.

More particularly, the invention concerns an apparatus of the above kind suitable for centrifugal separation and filtering of combustible and incombustible fluids, or that can be employed in the food field, for example for the filtering and separation of alimentary oils, realised in such a way to be manufactured with extremely reduced sizes in view of the specific task.

The following specification will refer to the use of that apparatus in the field concerning the separation and the filtering of combustible liquids in the nautical field, the apparatus being able to pre-filter sea water before its desalination. It is evident that the apparatus according to the invention can be used in many other fields, particularly in the food industry.

As is well known, presently the centrifugal separators provided on boats in order to separate the fuel from the water and the other impurities before the fuel is sent to the engine have large sizes and are very expensive.

On the other hand, it is also known that their use is unavoidable in order to avoid damaging of the engine injection system and mainly to avoid a breakdown at sea due to the entrance of water or impure substances in the powering apparatuses or the clogging of the filters.

However, it is well evident that the known centrifugal separators have noticeable problems, particularly in very little boats.

A first problem is that the costs of known centrifugal separators are objectively not proportioned with respect to the value of the boat.

Another problem, surely more important, is the one concerning the overall dimensions. It is well known to everybody that the engine housing in any boat, and particularly in those having small or medium sizes, is rather narrow, so that it is difficult, and many cases impossible, to mount the separator.

Furthermore, none of the solutions presently available on the market are sufficiently reliable to guarantee a safe navigation.

Finally, another specific problem of the known separators is that they need to be operated by the user.

Applicants have realised an apparatus of the above kind that can be miniaturised in function and is suitable for any kind of available space.

Another object of the present invention is that of realising an inexpensive apparatus.

A still further object of the present invention is that of providing an extremely reliable apparatus which does not require the intervention of the operator for its operation.

Another object of the present invention is that of providing an apparatus which operates without exposing the products to the environment.

Still another object of the present invention is that of providing an apparatus that can be used in different technical fields, among which the food field for the treatment of some products, for example for guaranteeing a higher purity in bottling plants for mineral water, wine or oil without the exposure of the products to the environment, thus preventing the oxidation phenomenon.

It is therefore a specific object of the present invention to provide a reduced size apparatus for centrifugal separation, comprising a housing, motor means coupled to said housing and provided with a rotary shaft, cartridge means, provided within said housing and coupled with said rotary shaft, at least a first feeding channel for the liquid to undergo the centrifugal treatment from outdoors within said cartridge means, at least a second channel through said rotary shaft, communicating with said cartridge means, and at least a third channel for the ejection of the liquid, communicating with said second channel.

Preferably, according to the invention, said cartridge means provide filtering means upstream with respect to the second channel.

Further, according to the invention, said apparatus can be provided with automatic operation means and/or failure pilot light.

Said motor means, which can be electrical or mechanical, can be, according to the invention, provided with means for adjusting the rotation speed.

According to the invention, the cartridge means can be provided with an outlet valve for the separated substances.

Still according to the invention, said cartridge means can be of the disposable kind, being removably coupled with said rotary shaft.

Further, means for fixing the apparatus according to the invention to a wall could be provided, for example a bracket and a plurality of screws.

Always according to the invention, more apparatuses serially or parallel connected can be provided.

Finally, it can be provided with an exhaust fan for the removal of gases from the engine room, as provided by existing regulations.

The present invention will be now described for illustrative, but not for limitative purposes according to its preferred embodiments, with particular reference to the figures of the enclosed drawings, wherein.

Figure 1:
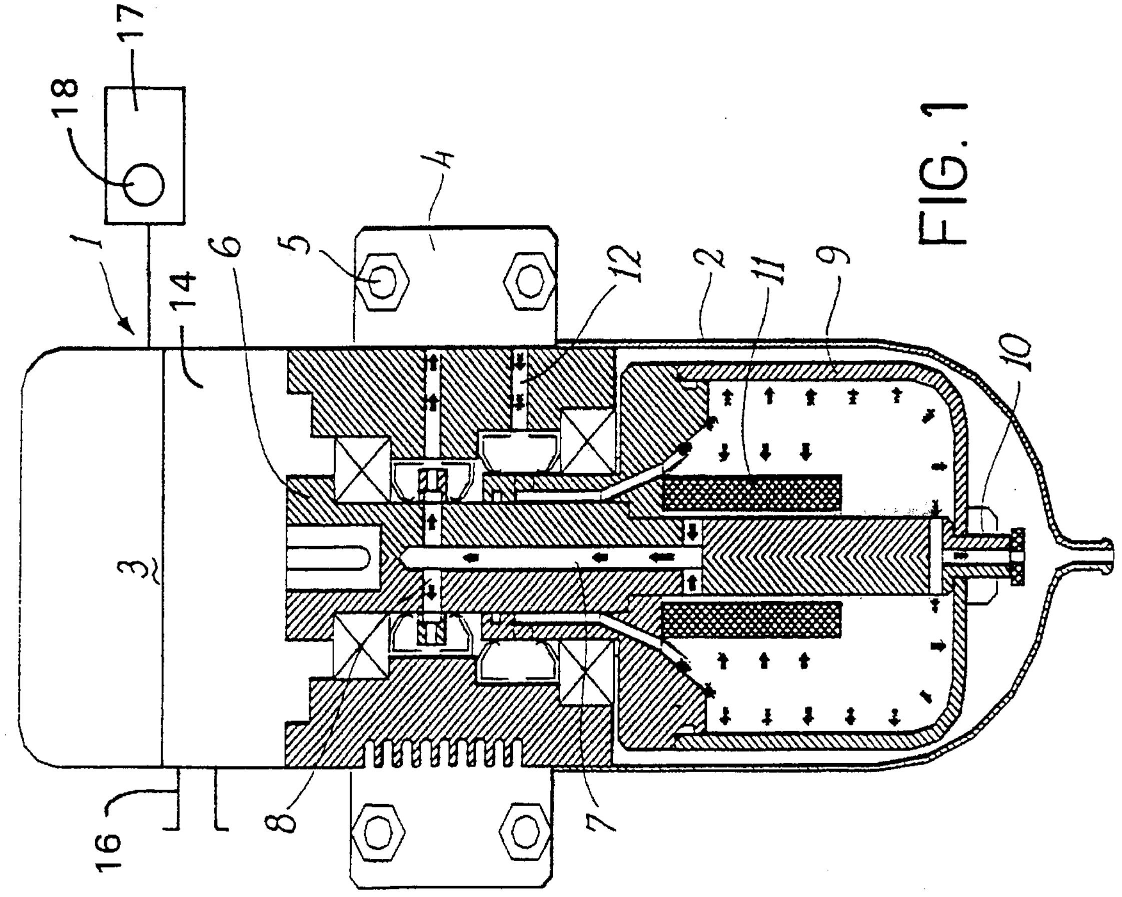
FIG. 1 is a section view of a first embodiment of the apparatus according to the invention.
Figure 3:
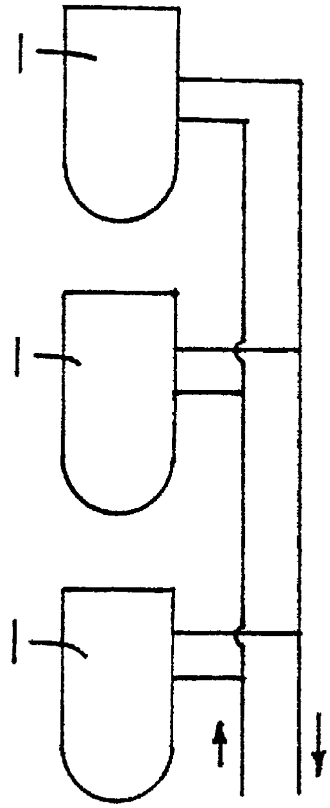
FIG. 3 is a diagrammatic view of four units according to the invention connected together in parallel.
Figure 4:
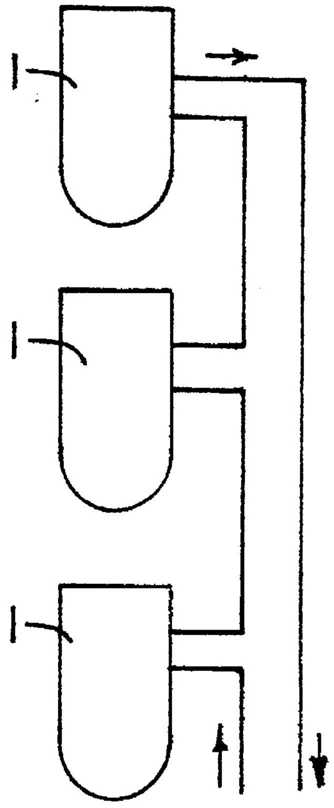
FIG. 4 is a diagrammatic view of four units according to the invention connected together in series.

Observing FIG. 1, the apparatus 1 according to the invention comprises a housing 2 and a motor 3 coupled above said housing.

Said housing is provided with a bracket 4 for the fixing of the apparatus 1 on a wall by the bolts 5 or similar fixing means.

Said motor 3 is provided with a rotary shaft 6, within which there is a first channel 7 for feeding liquid into the interior chamber of a cartridge 9, and a second channel 8 for discharging liquid from the chamber of the cartridge.

The speed of the motor can be adjusted by a knob 18 on a control 17. The motor 3 also drives an engine room exhaust fan which has an air outlet 16.

In the lower portion of the housing 2, a cartridge 9 fixedly rotating with said shaft 6.

The lower region of the cartridge 9 is provided with an outlet valve 10 and said shaft is provided at the entrance of said channels 7. The interior chamber of the cartridge 9 is closed except for the channels 7 and 8. The discharge channel 8 has an inlet which is in an upper region of the cartridge chamber, and the discharge channel extends upwardly from the chamber. The filter is concentric with the shaft 6, and it surrounds the inlet to the channel 8.

Furthermore, channels 12 for the entrance of the liquid to be centrifuged are provided on the housing.

The liquid, such as engine fuel oil, along with its impurities and water enters through the channels 12 and goes into the cartridge 9, which is rotating with the shaft 6 of the motor 3.

Here, due to centrifugation of the heavier liquid, the water remains within the cartridge, while the lighter liquid, fuel oil, passes through the channels 7 and 8 to be sent to the boat engine.

The filter 11 will eliminate the solid impurities.

When the cartridge 9 becomes full, the valve 10 is opened and the water is discharged so that the apparatus is again able to operate.

Figure 2:
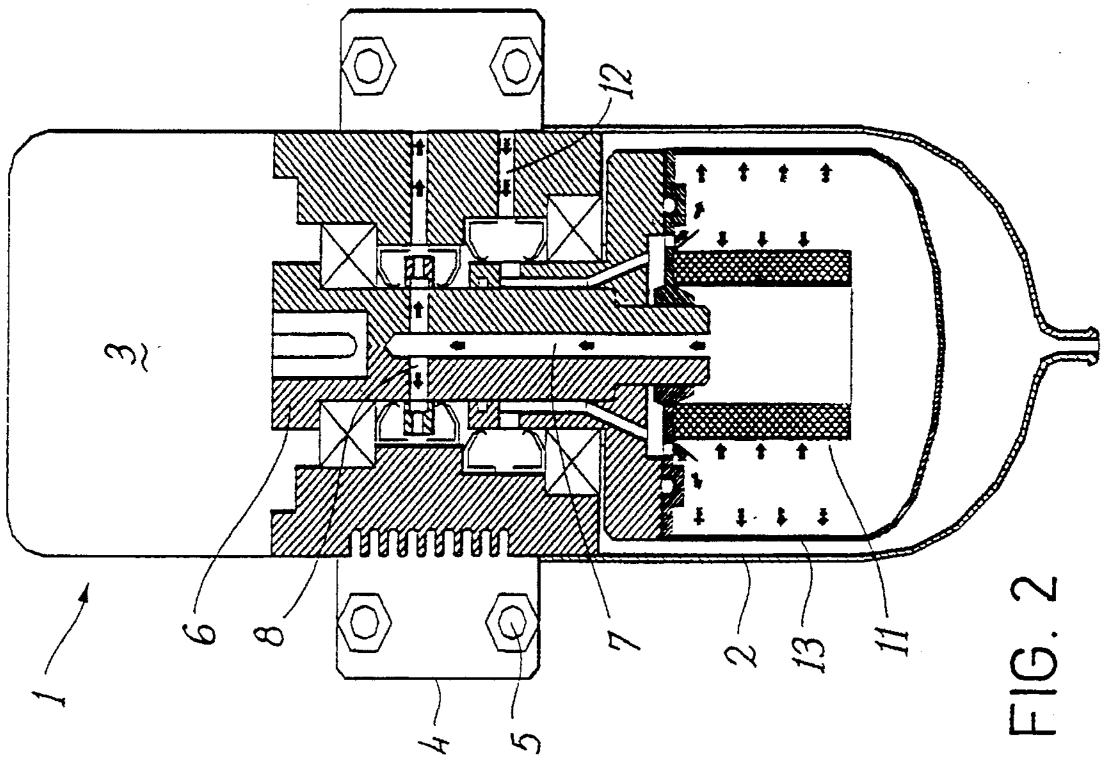
FIG. 2 is a section view of a second embodiment of the apparatus according to the invention.

The solution shown in FIG. 2 is very similar to the solution of FIG. 1, so that the corresponding parts will be indicated by the same numerical references.

In this case the cartridge 13 is disposable, so that once it is full, it is sufficient to remove the cartridge and to replace the same by a new one.

In a marine installation, for example, a pair of apparatuses 1 working in parallel according to the invention can be provided, so that it is possible to work with maximum safety without risking a breakdown with irreparable failures.

As already mentioned, the apparatus according to the invention can utilize an electric or mechanical motor, having an adjustable speed, provided with an automatic operation and failure pilot light.

The present invention has been described for illustrative, but not limitative purposes according to its preferred embodiments, but it is to be understood that modifications and/or changes can be introduced by those skilled in the art without departing from the relevant scope as defined in the enclosed claims.

We claim:

1. A compact centrifugal separation apparatus comprising:

a housing;

a motor mounted on the housing and provided with a rotary shaft;

a cartridge which is located in the housing, said cartridge being coupled to and rotated by the shaft;

said cartridge having an interior chamber;

a first channel for feeding liquid into the cartridge;

a second channel which extends from said interior chamber of the cartridge and through said shaft;

a discharge channel which is in communication with said second channel;

said interior chamber of the cartridge being closed except for said first and second channels.

2. Apparatus according to claim 1 wherein said second channel has an inlet which is in an upper region of said chamber.

3. Apparatus according to claim 1 having a filter which is in said chamber, said filter being concentric with said shaft, said second channel having an inlet which is surrounded by said filter.

4. Apparatus according to claim 1, wherein said cartridge includes a filter which is upstream of said second channel.

5. Apparatus according to claim 1, wherein said motor is an electric motor.

6. Apparatus according to claim 1, having means for adjusting the speed at which said motor rotates.

7. Apparatus according to claim 1, wherein said cartridge has an outlet valve for draining separated substances from said interior chamber.

8. Apparatus according to claim 1, wherein said cartridge is removably coupled to said rotary shaft and is disposable.

9. Apparatus according to claim 1, including means for fixing the apparatus to a wall.

10. Apparatus according to claim 1, in combination with at least one other said apparatus which is serially connected thereto.

11. Apparatus according to claim 1, in combination with at least one other apparatus which is connected thereto in parallel.

12. Apparatus according to claim 1, including a fan for removing gases from an engine room.

* * * * *